(12) United States Patent
Suzuki et al.

(10) Patent No.: US 6,738,708 B2
(45) Date of Patent: May 18, 2004

(54) ENGINE SPEED CONTROLLER FOR A MARINE PROPULSION ENGINE

(75) Inventors: Masaru Suzuki, Shizuoka (JP); Sadato Yoshida, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 131 days.

(21) Appl. No.: 10/052,410

(22) Filed: Jan. 18, 2002

(65) Prior Publication Data
US 2002/0177940 A1 Nov. 28, 2002

(30) Foreign Application Priority Data

Jan. 19, 2001 (JP) .................................... 2001-012273

(51) Int. Cl.[7] .............................................. G06F 19/00
(52) U.S. Cl. ...................................... 701/110; 123/352
(58) Field of Search ...................... 123/352, 339.23, 123/585, 319, 328; 701/110

(56) References Cited

U.S. PATENT DOCUMENTS

| | | |
|---|---|---|
| 3,200,782 A | 8/1965 | Walden et al. |
| 3,958,524 A | 5/1976 | Cantley et al. |
| 4,337,742 A | 7/1982 | Carlson et al. |
| 4,359,983 A | 11/1982 | Carlson et al. |
| 4,470,391 A | 9/1984 | Ishida |
| 4,550,703 A | 11/1985 | Ootuka et al. |
| 4,773,362 A * | 9/1988 | Wissmann et al. ...... 123/179.16 |
| 4,877,003 A | 10/1989 | Shimomura et al. |
| 4,939,661 A | 7/1990 | Barker et al. |
| 5,070,803 A | 12/1991 | Smith |
| 5,075,693 A | 12/1991 | McMillan et al. |
| 5,095,873 A | 3/1992 | Motoyama et al. |
| 5,148,788 A | 9/1992 | Saikalis et al. |
| 5,305,701 A | 4/1994 | Wilson |
| 5,362,263 A | 11/1994 | Petty |
| 5,364,322 A | 11/1994 | Fukui |
| 5,450,828 A | 9/1995 | Sakamoto et al. |
| 5,463,993 A | 11/1995 | Livshits et al. |
| 5,467,282 A | 11/1995 | Dennis |
| 5,525,081 A | 6/1996 | Mardesich et al. |
| 5,586,535 A | 12/1996 | Syomura |
| 5,592,382 A | 1/1997 | Colley |
| 5,610,815 A | 3/1997 | Gudat et al. |
| 5,751,344 A | 5/1998 | Schnee |
| 5,765,528 A | 6/1998 | Kamimaru |
| 5,884,213 A | 3/1999 | Carlson |
| 5,983,159 A | 11/1999 | Schipper |
| 6,079,389 A | 6/2000 | Ono et al. |
| 6,109,986 A | 8/2000 | Gaynor et al. |
| 6,119,653 A * | 9/2000 | Morikami .............. 123/339.23 |
| 6,273,771 B1 | 8/2001 | Buckley et al. |
| 6,543,429 B2 * | 4/2003 | Osakabe et al. ............ 123/585 |

* cited by examiner

*Primary Examiner*—John Kwon
(74) *Attorney, Agent, or Firm*—Knobbe, Martens, Olson & Bear, LLP

(57) ABSTRACT

An electronically controlled engine speed system for an outboard motor regulates the speed of the engine to ensure proper watercraft speed. A remote input device can program the preferred embodiments of the system. The preferred embodiments of the system recognize an engaged transmission and control engine speed by changing the ignition timing, fuel injection amount, and a throttle bypass valve.

4 Claims, 6 Drawing Sheets

ENGINE SPEED CONTROLLER FOR A MARINE PROPULSION ENGINE

PRIORITY INFORMATION

This application is based on and claims priority to Japanese Patent Application No. 2000-012273, filed Jan. 19, 2001 the entire contents of which is hereby expressly incorporated by reference.

1. Field of the Invention

The present invention relates generally to an engine speed control system for an engine, and more particularly to an engine speed control system to regulate boat-trolling speeds for an outboard motor.

2. Description of the Related Art

In many forms of marine propulsion systems, the powering internal combustion engine drives a propulsion device through a transmission for propelling the boat at various operator controlled speeds. Conventionally, when trolling at low speeds, the operator constantly monitors and controls the engine speed through manual throttle position control. Normally this type of manual throttle position does not provide for smooth or safe constant engine and boat speeds. At trolling boat speeds, it is important that the engine and boat operate at a constant, smooth speed so that the operator can concentrate on participating in various low speed recreational activities, for example fishing.

SUMMARY OF THE INVENTION

The present invention relates to an engine speed control system in which a trolling speed of a watercraft is programmed and maintained. The present invention provides the operator with electronically controlled smooth, constant trolling boat speeds in order to provide a safe, low boat speed environment.

One aspect of the preferred embodiment includes a remote programming module in order to set various engine speeds conveniently and exact directly into the electronic control unit (ECU). The engine speed control system comprises various input parameters such as a crankshaft position and speed sensor, an engine temperature sensor, a throttle position sensor, and a clutch sensor in order to allow the ECU to maintain the programmed watercraft trolling speed. The ECU uses a step-by-step procedure to increase or decrease the engine speed in order to provide smooth transitions in watercraft speed variations.

The direct, precise programming and maintaining of the watercraft trolling speed by the ECU provides for a safer and more enjoyable environment for boat operation.

BRIEF DESCRIPTION OF THE DRAWINGS

The foregoing features, aspects, and advantages of the present invention will now be described with reference to the drawings of a preferred embodiment that is intended to illustrate and not to limit the invention. The drawings comprise six figures in which.

DETAILED DESCRIPTION OF THE PREFERRED EMBODIMENT

The Overall Construction

Figure 1:
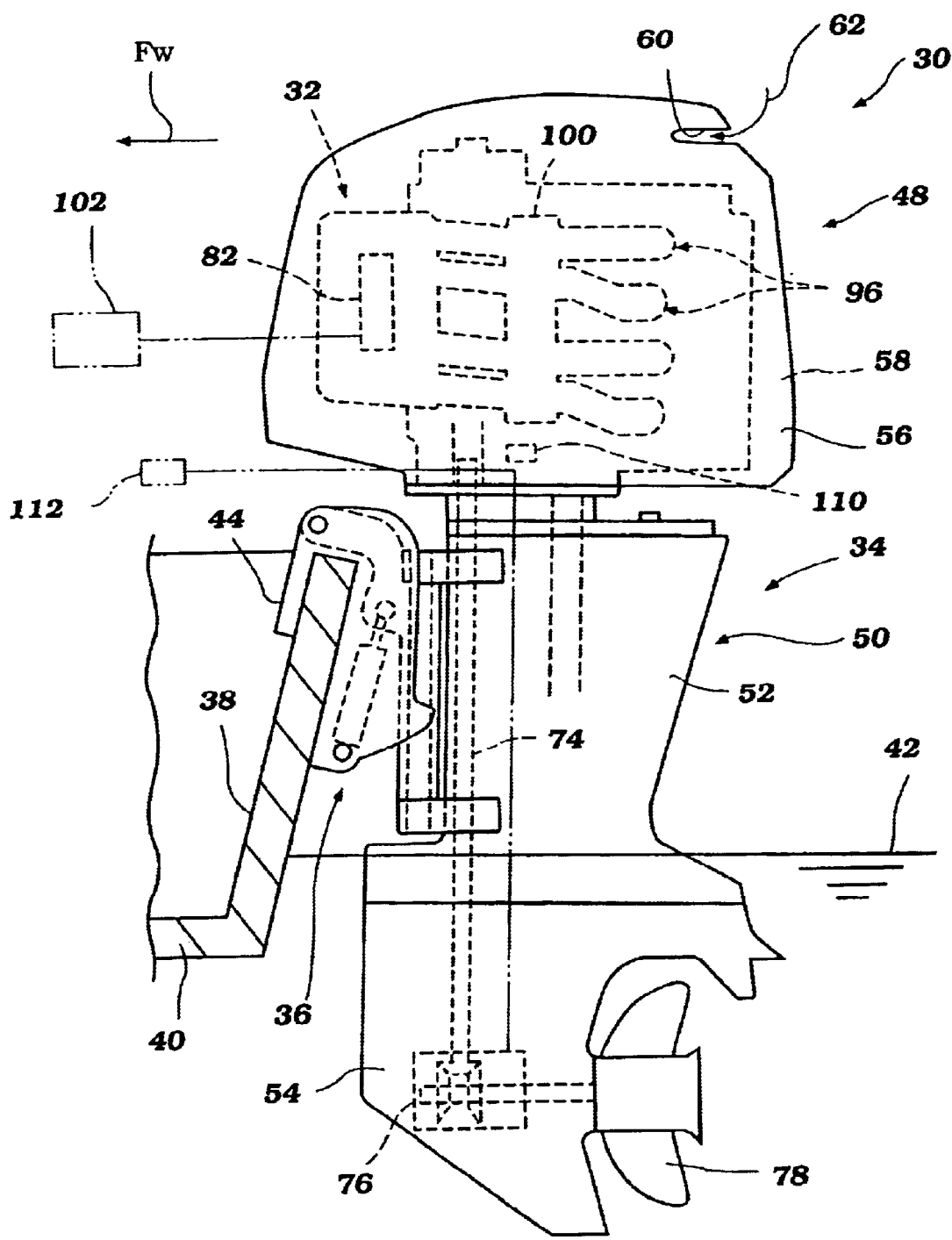
FIG. 1 is a side elevational view of an outboard motor configured in accordance with a preferred embodiment of the present invention, with an associated watercraft partially shown in section.
Figure 2:
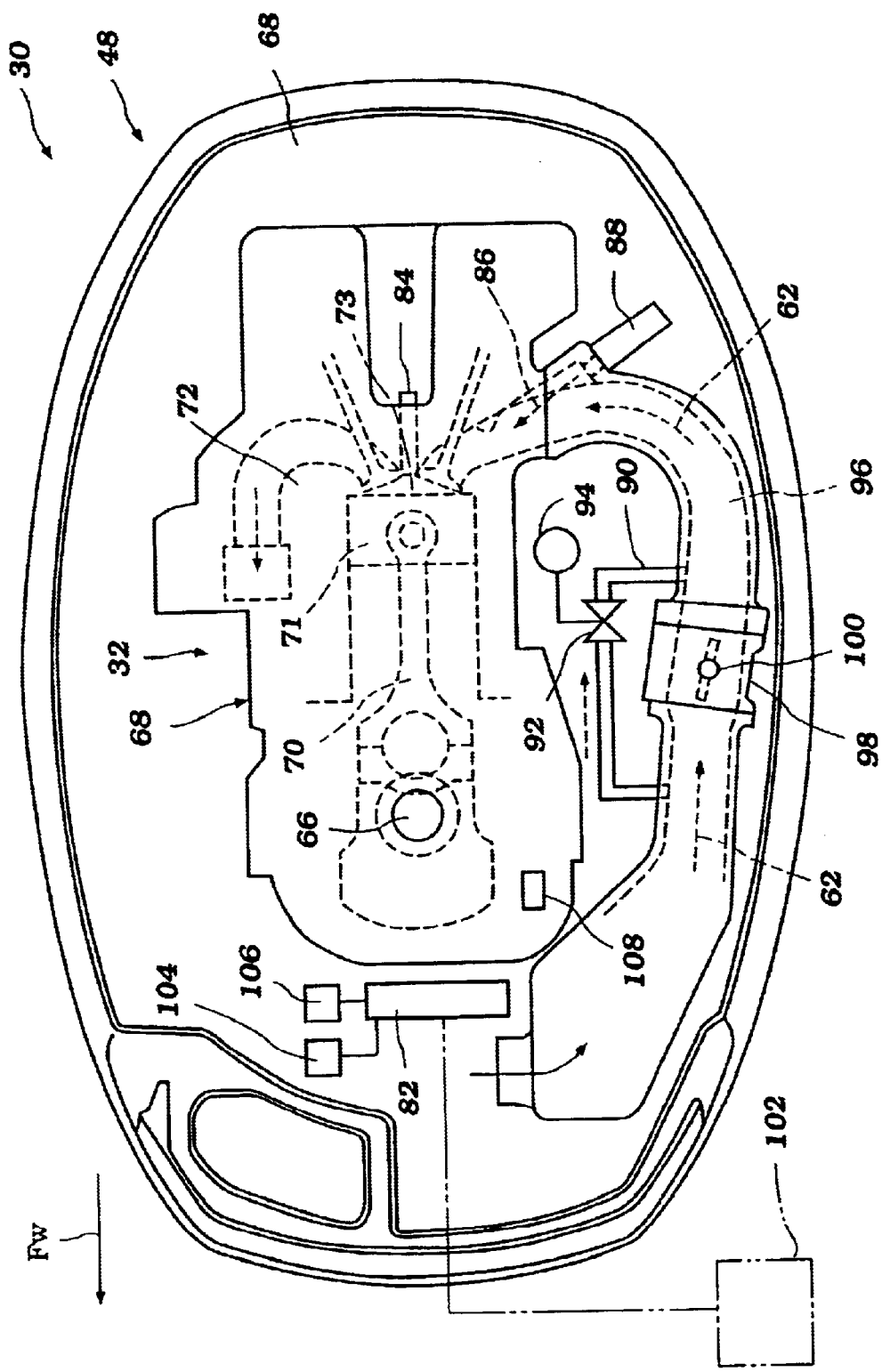
FIG. 2 is a top view of an outboard motor configured in accordance with a preferred embodiment of the present invention, with various parts shown in phantom.

With reference to FIG. 1 an overall construction of an outboard motor 30 that employs an internal combustion engine 32 configured in accordance with certain features, aspects and advantages of the present invention will be described. The engine 32 has particular utility in the context of a marine drive, such as the outboard motor 30 for instance, and thus is described in the context of an outboard motor. The engine 32, however, can be used with other types of marine drives (i.e., inboard motors, inboard/outboard motors, etc.) and also certain land vehicles, which includes lawnmowers, motorcycles, go carts, all terrain vehicles and the like. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 includes bracket 44 to support the drive unit 34 on a transom 38 of an associated watercraft 40 and provides for positioning a marine propulsion device in a submerged position with the watercraft 40 resting relative to a surface 42 of a body of water.

As used through this description, the terms "forward," "forwardly" and "front" mean at or to the side where the bracket assembly 36 is located, unless indicated otherwise or otherwise readily apparent from the context use. The arrow Fw of FIG. 1 indicates the forward direction. The terms "rear," "reverse," "backwardly" and "rearwardly" mean at or to the opposite side of the front side.

The illustrated drive unit 34 comprises a power head 48 and a housing unit 50, which includes a driveshaft housing 52 and a lower unit 54. The power head 48 is disposed atop the housing unit 50 and includes an internal combustion engine 32 that is positioned within a protective cowling 56, which preferably is made of plastic. In most arrangements, the protective cowling 56 defines a generally closed cavity 58 in which the engine 32 is disposed. The engine, thus, is generally protected from environmental elements within the enclosure defined by the cowling 56.

The protective cowling 56 preferably has a rear intake opening 60 defined through an upper rear portion. A rear intake member with one or more air ducts is unitarily formed with or is affixed to the protective cowling 56. Induction air 62 is drawn into the closed cavity 58 via the rear intake opening 60 and the air ducts of the rear intake member as indicated by arrow 62 of FIG. 1. Typically, the protective cowling member 56 tapers in girth toward its top surface, which is in the general proximity of the air intake opening 60. The taper helps to reduce the lateral dimension of the outboard motor, which helps to reduce the air drag on the watercraft during movement.

The engine 32 in the illustrated embodiment operates on a four-cycle combustion principle. This type of engine, however, merely exemplifies one type of engine on which various aspects and features of the present invention can be suitably used. Preferably, the engine has at least one cylinder bank. An engine having an opposing cylinder arrangement can use certain features of the present invention. Engines having other numbers of cylinders, having other cylinder arrangements (in-line, opposing, etc.), and operating on other combustion principles (e.g., crankcase compression two-stroke or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A crankshaft 66 extends generally vertically through a cylinder block 68. Connecting rods 70 couple the crankshaft 66 with respective pistons 71 in any suitable manner. Thus, the reciprocal movement of the pistons rotates the crankshaft 66. The pistons 71 along with the cylinder block 68 and a cylinder head assembly 72 together define a combustion chamber 73.

Preferably, the cylinder block 68 is located at the forwardmost position of the engine 32; the cylinder head assembly 72 being disposed rearward from the cylinder block 68. Generally, the cylinder block 68 (or individual cylinder bodies) and the cylinder head assembly 72 together define the engine 32. Typically, at least these major engine assemblies 68 and 72 are substantially made of aluminum alloy. The aluminum alloy advantageously increases strength over cast iron while decreasing the weight of the engine 32.

The engine 32 will also typically include a cooling system, a lubrication system and other systems, mechanisms or devices other than the systems described above.

With reference again to FIG. 1, the driveshaft housing 52 depends from the power head 48 to support a driveshaft 74 which is coupled with the crankshaft 66 and which extends generally vertically through the driveshaft housing 52. The driveshaft 74 is journaled for rotation and is driven by the crankshaft 66.

The lower unit 54 depends from the driveshaft housing 52 and supports a transmission unit 76 that is driven by the driveshaft 74. The transmission unit includes forward and reverse gears, which are engaged with the driveshaft 74 through a dog clutch mechanism (not shown). The dog clutch engages the forward gear in order to let torque be transmitted from the driveshaft to a propulsion device to propel the watercraft 40 forward. The dog clutch can also engage the reverse gear in order to propel the watercraft 40 rearward. In the illustrated arrangement, the propulsion device is a propeller 78 that is affixed to the transmission unit 76. The propulsion device, however, can take the form of a dual counter-rotating system, a hydrodynamic jet, or any of a number of other suitable propulsion devices.

The Engine Speed Control System

The engine speed control system enables its operator to set and safely maintain a desired watercraft trolling speed. Various parameter signals are input to an Electronic Control Unit (ECU) 82 where these signals are processed and the speed of the engine 32 is then automatically controlled in order to maintain a desired watercraft speed. These various input parameters include, but are not limited to a crankshaft position sensor 104 for detecting specific crankshaft angles, a crankshaft speed sensor 106 for detecting the speed of the engine, an engine temperature sensor 108 for detecting the temperature of the cylinder block 68, and a throttle position sensor 100 for detecting the amount of torque desired by the operator. The crankshaft position sensor 104 and the crankshaft speed sensor 106 may be incorporated into one pulsar coil device and the common signal separated into two signals within the ECU 82.

Various output controlled functions provided by the ECU 82 automatically control the engine speed. These functions include advancing or retarding the ignition timing of one or more spark plugs 84, changing the amount of fuel 86 and injection timing of one or more fuel injectors 88, or allowing more or less induction air 62 thorough a bypass line 90 controlled by a bypass valve 92 through a motor 94. The bypass line 90 provides an alternate route for the induction air 62 to enter the engine 32 through an intake manifold 96 bypassing a throttle valve 98.

Embodiments of the present invention provide for modifying the program in the ECU 82 to change the desired trolling speed. In the embodiment, a remote input device 102 coupled to ECU 82 is a keyboard and the modified program is inputted into the ECU 82 by typing on the keyboard or on the other input means of device 102. In another embodiment, the desired program may be initially installed in the portable terminal 102 and subsequently inputted to the ECU 82. Other connections for programming the ECU 82 from the remote device include, for example, an infrared remote link or through a device employing a radio frequency to communicate with the ECU 82. After the watercraft operator or another enters into the remote input device 102 the program for the desired watercraft trolling speed, the ECU 82 then converts the desired watercraft speed into the corresponding engine speed and automatically controls the engine 32 through various input parameters. Some of these engine input parameters include, but are not limited to a crankshaft position sensor 104, a crankshaft speed sensor 106, an engine temperature sensor 108, and a throttle position sensor 100.

Another embodiment of the present invention for setting the desired trolling speed includes removing the protective cowling 56, attaching a cable from a remote device to the ECU 82, and downloading the program to the ECU 82. This way of programming the ECU 82 can be accomplished during manufacturing or at the watercraft dealer in order to inhibit the user from changing the pre-programmed trolling speed. The user can then activate the pre-set trolling speed by several possible means including a switch.

The preferred embodiment of the present invention also incorporates a clutch sensor 110 in order to communicate to the ECU 82 if the transmission unit 76 is engaged in a forward or reverse gear. In this preferred embodiment, ECU 82 can therefore control the speed of the watercraft when a drive gear is engaged and prevent engine over revving when the clutch mechanism is not engaged. For example, if the watercraft is traveling at a programmed speed and the operator should disengage forward or reverse gear the ECU 82 can lower the engine speed to prevent engine over revving.

Figure 3:
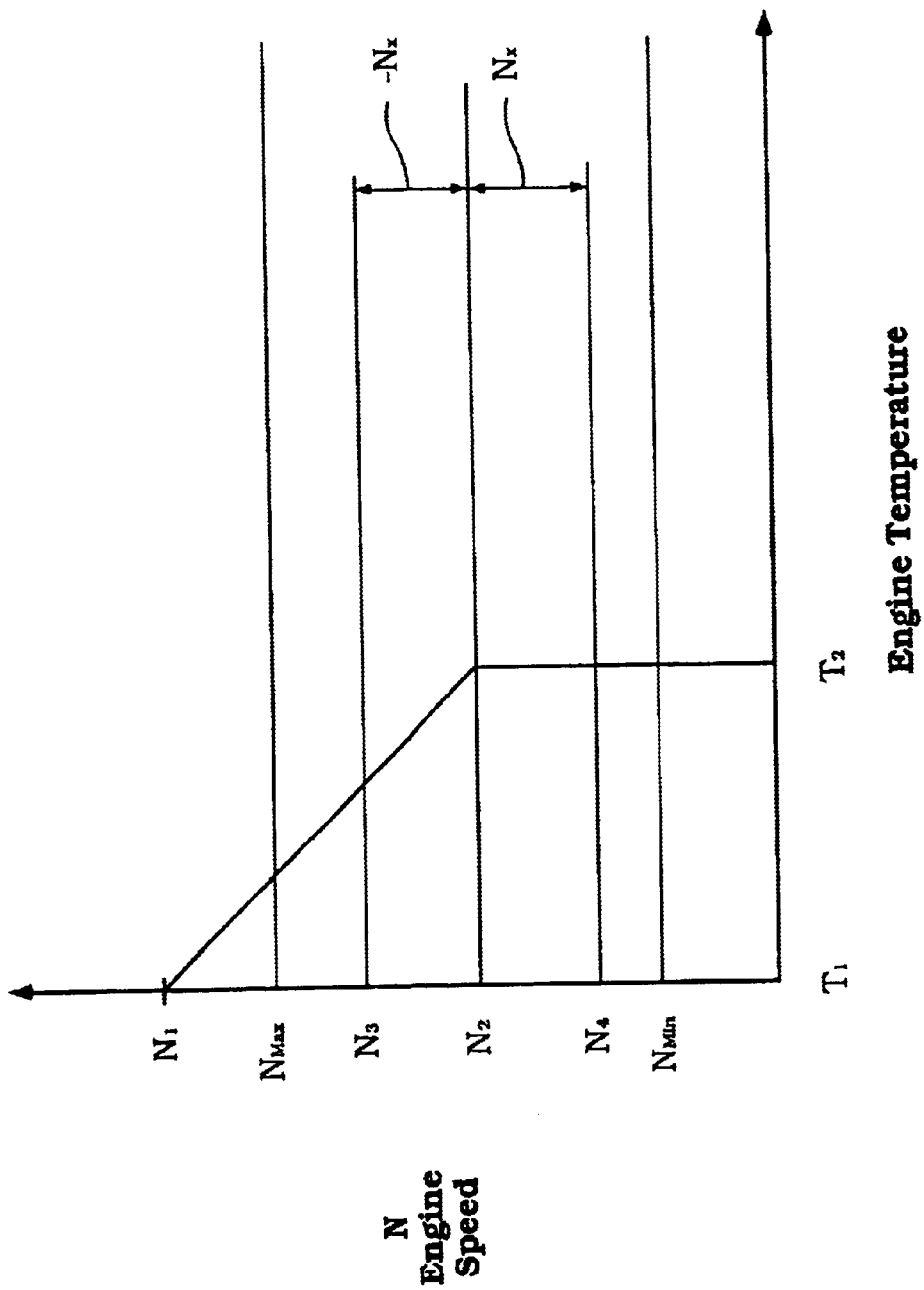
FIG. 3 is a graphical view showing the relationship between the engine temperature and the desired engine speed.

The automatic control over the trolling boat speed is further illustrated with reference to FIGS. 3–6. Referring to FIG. 3, one example of engine speed control is illustrated. In order to achieve the correct engine operating temperature as quickly as possible, the engine speed can be varied accordingly. During a cold temperature T1, the ECU 82 sets the engine speed to N1. N1 can be set to be larger than the maximum programmable boat trolling speed Nmax. As the engine temperature raises to T2, the ECU 82 lowers the engine speed to N2.

The programmed ECU 82 can advantageously adjust the ignition timing, fuel injection amount and timing, and auxiliary induction air to change the amount of speed $-N_x$ between engine speeds $N_2$ and $N_3$ or $+N_x$ between engine speeds $N_2$ and $N_4$ to achieve the desired engine speed corresponding to the desired boat trolling speed.

Figure 4:
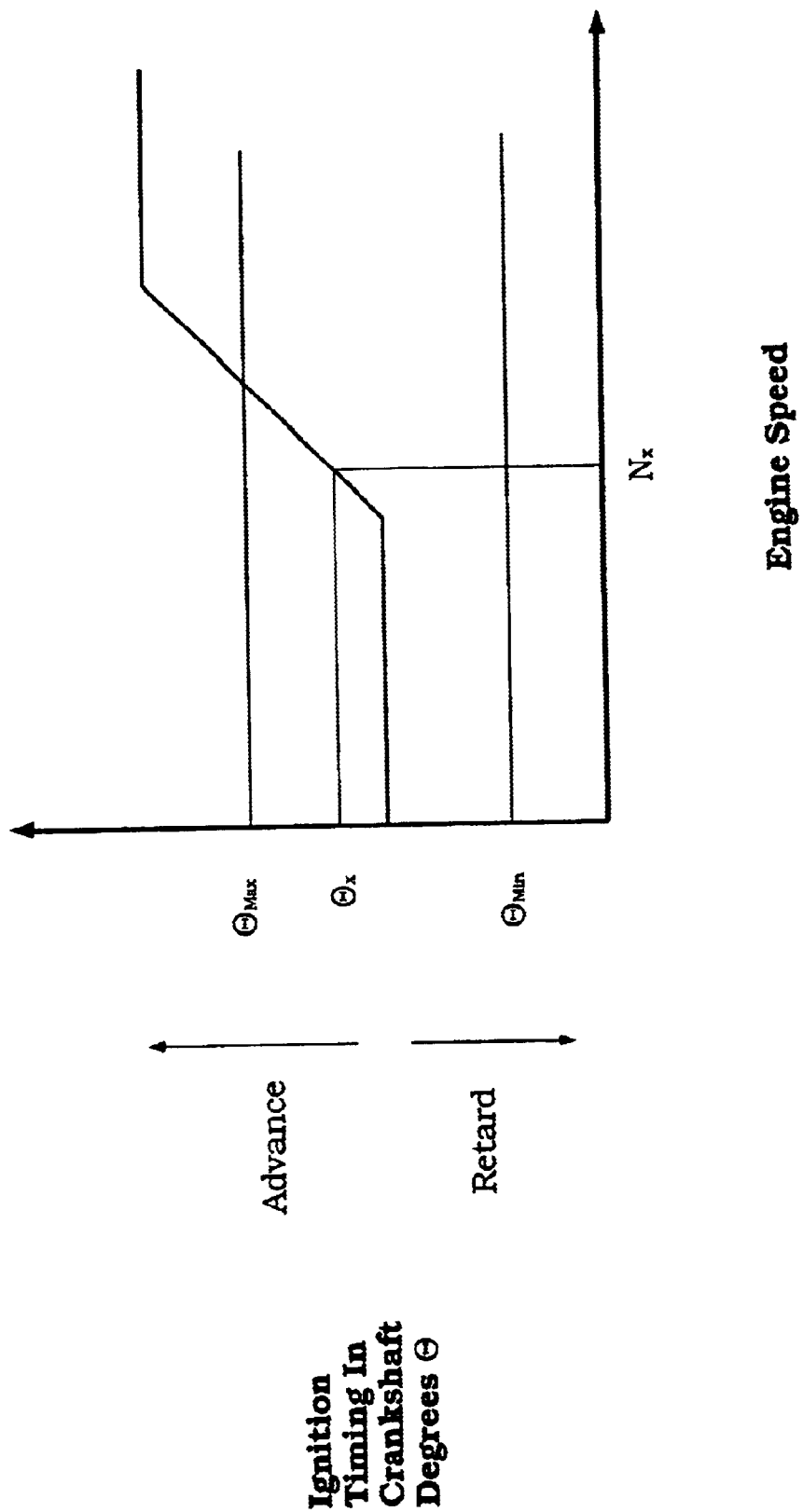
FIG. 4 is a graphical view showing the relationship between the ignition timing and the engine speed.

FIG. 4 illustrates an example of how the ECU 82 controls the ignition timing of the spark plug 84 in crankshaft degrees $\Theta$ depending on engine speed N. The value $\Theta_x$ corresponds to an engine speed $N_x$ along one possible ignition timing curve. $\Theta_{min}$ and $\Theta_{max}$ represent the allowable range at which the crankshaft angle can be manipulated to achieve a programmed trolling engine speed.

Figure 5:
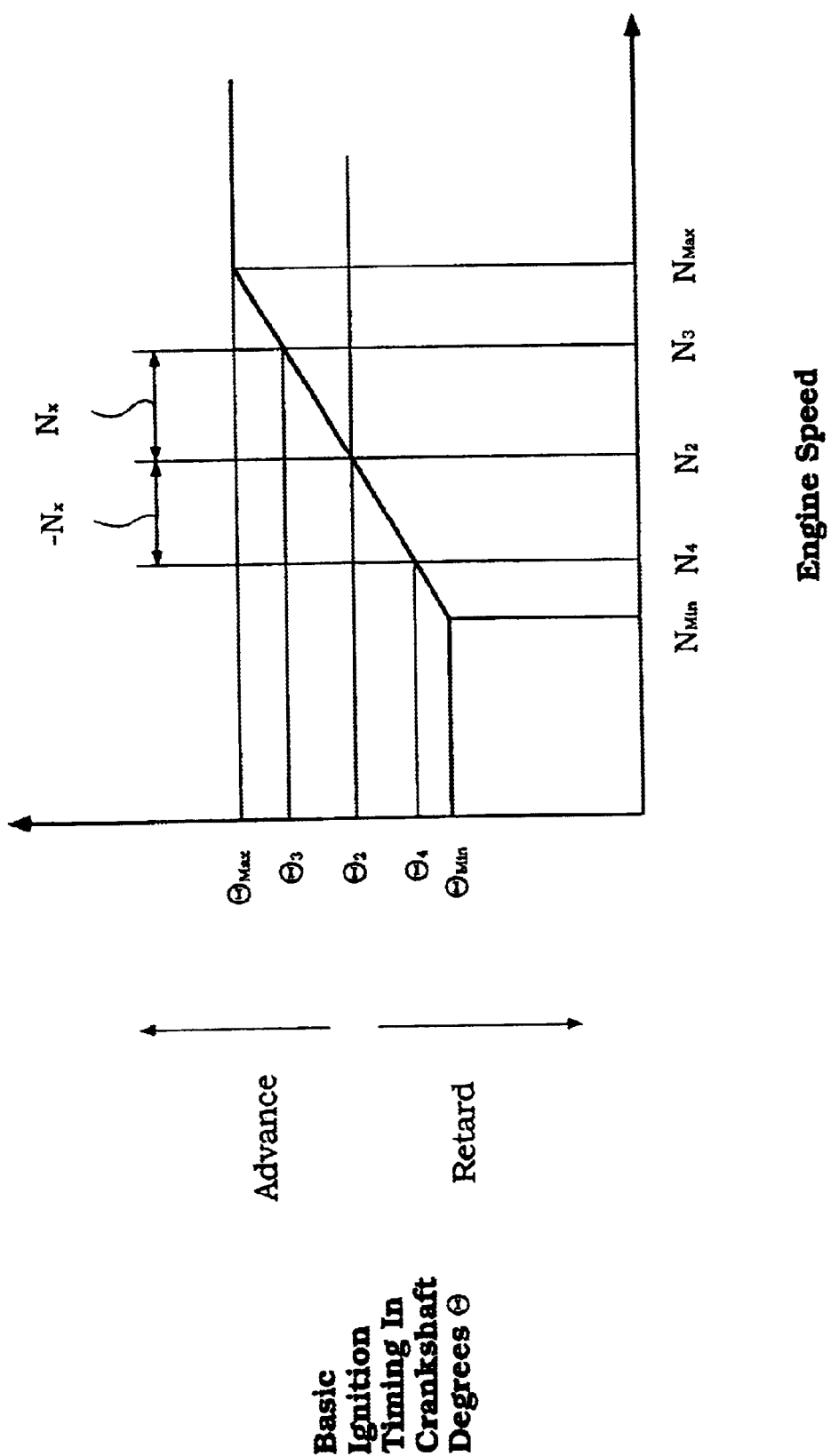
FIG. 5 is a graphical view showing a more specific relationship between the ignition timing and the engine speed.

FIG. 5 shows in more detail how a target trolling engine speed can be achieved through varying the crankshaft angle $\Theta$. Each value of the engine speed N corresponds to a crankshaft angle value $\Theta$. $\Theta_{min}$ corresponds to $N_{min}$, $\Theta_2$ corresponds to $N_2$, etc. As the engine speed N varies from its initial operator setting due to various influences from the surrounding environment, for example water waves or currents, the ECU 82 compensates the ignition timing setting in order to maintain the desired engine speed.

An example of an engine speed change by advancing the ignition timing to achieve a change in engine speed of $+N_x$ between $N_3$ corresponding to $\Theta_3$ and $N_2$ corresponding to $\Theta_2$ as well as an engine speed change by retarding the ignition timing to achieve a change in engine speed of $-N_x$ between engine speeds $N_2$ and $N_4$ corresponding to $\Theta_4$ can be seen. The ignition timing adjustment throughout all engine speed variations are kept between the values $\Theta_{min}$ and $\Theta_{max}$.

Figure 6:
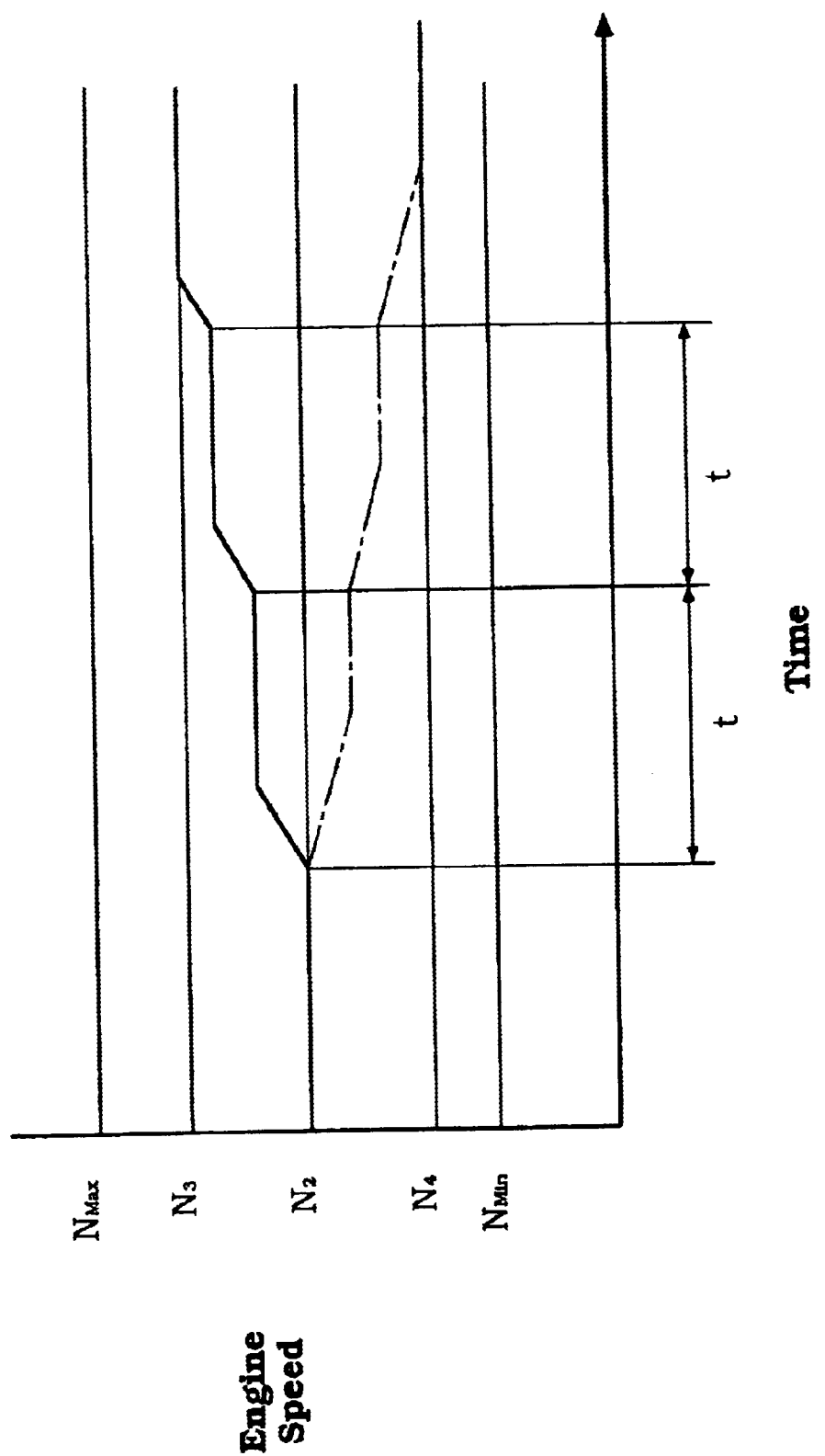
FIG. 6 is a graphical view showing a change in engine speed with reference to time.

FIG. 6 illustrates how the ECU 82 preferably controls the engine speed using a step function with reference to time. Each correction or change in engine speed is achieved by the ECU through careful change of the ignition and/or fuel injection timing, the fuel injection amount, or the allowable induction air. All of these control actions or a variation of the foregoing control actions are performed over a period of time "t" in order to provide a smooth transition from one speed to another. For example, when the engine speed is to be increased from $N_2$ to $N_3$, the ECU 82 increases the engine speed gradually over various time periods "t" until the desired speed $N_3$ is achieved. In the same way when a slower engine speed is desired, for example from $N_2$ to $N_4$, the ECU 82 gradually decreases the engine speed over a period of time "t" until the lower speed $N_4$ is achieved. All engine speed changes are performed between the minimum engine speed value $N_{min}$ and the maximum engine speed value $N_{max}$. Changing the engine speed by the various foregoing control actions in a gradual manner allows the desired engine speed to be achieved while maintaining a smooth operation avoiding sudden changes in watercraft speed providing a safer watercraft-trolling environment.

The embodiments thus far are all in connection with an outboard motor. However, the invention can also be utilized with various engines such as personal watercraft engines or land vehicle engines.

Thus, from the foregoing description it should be readily apparent that the start up control is very effective in providing a safe, programmable trolling watercraft speed and thus solving the problems described. Of course, the foregoing description is that of preferred embodiments of the invention and various changes and modifications may be made without departing from the spirit of the invention, as described by the appended claims.

What is claimed is:

1. An engine speed adjustment system for an internal combustion engine of a small watercraft comprising:
    an automatic control unit coupled to said combustion engine,
    a portable terminal storing a desired computer program for automatically regulating the trolling speed of said engine, said portable terminal and said control unit adopted for inputting said desired computer program into said control unit so that said internal combustion engine is controlled and a target engine speed is achieved during trolling.

2. An engine speed adjustment system as set forth in claim 1, wherein said internal combustion engine includes:
    an internal combustion engine body having a combustion chamber,
    intake passages for introducing atmospheric air into said combustion chamber,
    throttle valves for adjusting an opening of said intake passage,
    a bypass passage for introducing atmospheric air to said intake passage at a downstream side of said throttle valve, and
    an opening/closing valve for adjusting an opening of said bypass passage, said target engine speed of said internal combustion engine being controlled by said control unit actuating said opening/closing valve.

3. An engine speed adjustment system as set forth in claim 1, wherein said portable terminal to program said electronic control unit includes:
    an electronic transmission wire or a wireless means to communicate between the remote input device and the electronic control unit.

4. A method of automatically changing the desired trolling speed of a marine engine comprising:
    programming a portable control unit storing the desired components program,
    inputting said desired computer program into the electronic control unit of said marine engine, and
    using said programmed electronic control unit to automatically activate an opening of a bypass passage for introducing atmospheric air into the combustion chamber of said marine engine.

* * * * *